United States Patent
Mandalka et al.

(10) Patent No.: US 9,636,792 B2
(45) Date of Patent: May 2, 2017

(54) HANDHELD WORK APPARATUS HAVING A DRIVE MOTOR FOR DRIVING A WORK TOOL AND METHOD FOR OPERATING SAID APPARATUS

(71) Applicant: Andreas Stihl AG & Co. KG, Waiblingen (DE)

(72) Inventors: Markus Mandalka, Fellbach (DE); Georg Heinzelmann, Winnenden (DE); Klaus Kaupp, Stuttgart (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 511 days.

(21) Appl. No.: 14/138,974

(22) Filed: Dec. 23, 2013

(65) Prior Publication Data

US 2014/0174772 A1 Jun. 26, 2014

(30) Foreign Application Priority Data

Dec. 22, 2012 (DE) .......................... 10 2012 025 309

(51) Int. Cl.
| | | |
|---|---|---|
| B25B 21/02 | (2006.01) | |
| E21B 7/00 | (2006.01) | |
| B23Q 11/00 | (2006.01) | |
| B25F 5/02 | (2006.01) | |
| B27B 17/00 | (2006.01) | |
| B25F 5/00 | (2006.01) | |

(52) U.S. Cl.
CPC ............ B23Q 11/0089 (2013.01); B25F 5/00 (2013.01); B25F 5/02 (2013.01); B27B 17/0008 (2013.01)

(58) Field of Classification Search
CPC ..... B23Q 11/0089; B25B 23/16; B25B 15/06; B25F 5/02
USPC .......................................... 173/1–2, 168–170
See application file for complete search history.

(56) References Cited

U.S. PATENT DOCUMENTS

| | | | |
|---|---|---|---|
| 4,079,708 A | 3/1978 | Wieland et al. | |
| 4,196,836 A * | 4/1980 | Becht ................. | A61B 17/0684 227/110 |
| 4,302,880 A | 12/1981 | Elfving et al. | |
| 4,406,066 A | 9/1983 | Itzrodt | |
| 5,215,049 A | 6/1993 | Wolf | |
| 5,466,183 A * | 11/1995 | Kirn ...................... | B23D 45/16 173/170 |

(Continued)

FOREIGN PATENT DOCUMENTS

| | | |
|---|---|---|
| CN | 201092068 Y | 7/2008 |
| DE | 36 08 941 A1 | 9/1987 |
| JP | S57-123928 U | 8/1982 |

*Primary Examiner* — Robert Long
(74) *Attorney, Agent, or Firm* — Walter Ottesen, P.A.

(57) ABSTRACT

A handheld work apparatus has a drive motor for driving a tool, an operating element for operating the drive motor, a first inhibiting unit and a second inhibiting unit. Each inhibiting unit has a disable state and an enable state. The operating element is inhibited for operating the drive motor when at least one of the inhibiting units is in its disable state. The work apparatus further has a locking device which locks the first inhibiting unit in its enable state if the second inhibiting unit is in its enable state. A method for operating the work apparatus provides that the first inhibiting unit is locked in its enable state when the first inhibiting unit and the second inhibiting unit are situated in their enable states at the same time.

14 Claims, 10 Drawing Sheets

(56) References Cited

U.S. PATENT DOCUMENTS

| | | | | |
|---|---|---|---|---|
| 5,558,533 | A * | 9/1996 | Hashizawa | B60L 11/1818 439/310 |
| 5,681,214 | A * | 10/1997 | Kleider | B23D 45/16 451/344 |
| 5,862,713 | A | 1/1999 | Tsunoda et al. | |
| 6,108,867 | A | 8/2000 | Nagashima | |
| 7,287,331 | B2 * | 10/2007 | Sasaki | A01G 3/053 16/110.1 |
| 8,061,043 | B2 * | 11/2011 | Allen | B27B 9/02 30/388 |
| 8,739,894 | B2 * | 6/2014 | Schlauch | B25F 5/02 123/179.18 |
| 8,813,733 | B2 * | 8/2014 | Tamura | A01G 3/047 123/334 |
| 9,508,497 | B2 * | 11/2016 | Kuhnle | H01H 9/06 |
| 9,528,450 | B2 * | 12/2016 | Kurzenberger | F02D 29/00 |
| 2002/0059731 | A1 | 5/2002 | Zeiler et al. | |
| 2004/0034367 | A1 * | 2/2004 | Malinowski | 606/129 |
| 2008/0011592 | A1 * | 1/2008 | Liebert | B25F 5/02 200/43.11 |
| 2008/0121208 | A1 | 5/2008 | Rosskamp et al. | |
| 2009/0064504 | A1 | 3/2009 | Kodama et al. | |
| 2009/0112327 | A1 * | 4/2009 | Lane | A61N 1/0539 623/17.19 |
| 2010/0012700 | A1 * | 1/2010 | Perron | B25C 1/008 227/8 |
| 2010/0116863 | A1 * | 5/2010 | Suda | B25C 1/06 227/8 |
| 2010/0175972 | A1 * | 7/2010 | Kimata | H01H 3/20 200/318.1 |
| 2012/0074194 | A1 * | 3/2012 | Miller | B25C 1/04 227/8 |
| 2012/0138326 | A1 * | 6/2012 | Schlauch | B25F 5/02 173/170 |
| 2013/0334284 | A1 * | 12/2013 | Swayze | A61B 17/0682 227/180.1 |

* cited by examiner

HANDHELD WORK APPARATUS HAVING A DRIVE MOTOR FOR DRIVING A WORK TOOL AND METHOD FOR OPERATING SAID APPARATUS

CROSS REFERENCE TO RELATED APPLICATION

This application claims priority of German patent application no. 10 2012 025 309.5, filed Dec. 22, 2012, the entire content of which is incorporated herein by reference.

BACKGROUND OF THE INVENTION

In work apparatuses having a drive motor, it is known to provide an inhibitor for the operating element for operating the drive motor, in particular for the gas throttle. An inhibitor of this type can be, for example, a gas throttle inhibitor which is arranged so as to lie opposite the operating element or an inhibitor button which is arranged to the side of or adjacently to the handle. Inhibitors are known which have to be held in the actuated state permanently. Inhibitors are also known which have to be pressed in order to actuate the gas throttle and return into their inhibited position again when the gas throttle is released. As a result, the inhibitor button has to be pressed before every actuation of the gas throttle. The known inhibitors are therefore not ergonomic. It is also known to provide, in addition to the gas throttle inhibitor, a further inhibiting device which blocks the operating element. The further inhibiting device can be actuated, for example, via a sliding switch. The sliding switch has to be reset actively into the inhibited position by the operator. This requires an additional operating step by the operator.

SUMMARY OF THE INVENTION

It is an object of the invention to provide a handheld work apparatus having a drive motor for driving at least one tool and a method for operating the work apparatus which makes simple and ergonomic operation possible.

Unintentional actuation of the operating element can be ruled out reliably by virtue of the fact that two inhibiting devices or units are provided. In order that the drive motor can be operated via the operating element, both inhibiting devices have to be in their released or enabled state. In order to simplify the operation of the work apparatus and at the same time to ensure that both inhibiting devices are situated in the inhibited or disabled state when the work apparatus is released by the operator, that is, is put down, a locking device is provided which locks the first inhibiting device in its enabled state when the second inhibiting device is situated in its enabled state. As a result, the operator only has to hold the second inhibiting device in the actuated state continuously. The first inhibiting device is locked in its enabled state by the locking device and therefore does not have to be held in the actuated state after the adjustment of both inhibiting devices into their enabled state. The locking action is released when the first inhibiting device is restored into its disabled state. If the operating element, for example a throttle lever, is let go, the first inhibiting device is not yet restored into its disabled state. The first inhibiting device can be held in its enabled state by holding the second inhibiting device. The operating element can be let go here, without the enabled state of the first inhibiting device being canceled. This results in ergonomic operation. It is ensured at the same time that both inhibiting devices are in their disabled state when the operator restores the first inhibiting device into its disabled state, for example when switching off or letting go of the work apparatus.

The locking action of the first inhibiting device in the enabled state causes the system to store an adjustment of the first inhibiting device into the enabled state, which adjustment has taken place once. The storing takes place here from the time at which the second inhibiting device was adjusted into its enabled state, and until the time at which the second inhibiting device is adjusted back into its disabled state. Here, the locking action can be mechanical storing of the state, that is, mechanical fixing of the first inhibiting device in a position which is assigned to the enabled state, or electrical storing of the state, for example in a control device of the work apparatus.

The work apparatus advantageously has a blocking device which blocks the adjustment of the second inhibiting device into its enabled state when the first inhibiting device is situated in its disabled state. As a result, an operating sequence is stipulated for the first and the second inhibiting device. First of all, the operator has to adjust the first inhibiting device into its enabled state, in order for it to be possible to subsequently adjust the second inhibiting device into its enabled state. The locking of the first inhibiting device in its enabled state takes place only when the operator has adjusted both inhibiting devices in the stipulated sequence into their enabled state, and the operator can let go of an actuating element of the first inhibiting device. A simple design results if the blocking device comprises an inhibiting contour which blocks the adjustment of the second inhibiting device into its enabled state. However, it can also be provided that the blocking device is configured in the form of an electric circuit and the release of the operating element for operating the drive motor and the locking of the first inhibiting device in its enabled state take place only when the operator has adhered to the stipulated operating sequence, that is, has adjusted the first inhibiting device into its enabled state before the second inhibiting device.

The actuating direction of the first inhibiting device advantageously lies transversely with respect to the actuating direction of the second inhibiting device. The actuating direction of the first inhibiting device lies, in particular, perpendicularly with respect to the actuating direction of the second inhibiting device. Unintentional actuation of both inhibiting devices can be avoided reliably by way of this arrangement of the actuating directions. However, unintentional actuation of both inhibiting devices can also be achieved by a suitable arrangement of the actuating elements of the two inhibiting devices, for example by the arrangement at a correspondingly large spacing.

The locking device advantageously locks the first inhibiting device mechanically. The mechanically operating locking device can be produced simply and can have a robust construction. In particular, the first inhibiting device has an actuating element for adjusting the first inhibiting device from the inhibited or disabled state into the released or enabled state. For the second inhibiting device, a second actuating element for adjusting the second inhibiting device from the disabled state into the enabled state is advantageously provided. The locking device is formed, in particular, by the first actuating element and the second actuating element. A particularly simple construction results if the first and the second actuating element form both the locking device and the blocking device which stipulates the operating sequence.

As an alternative, it can be provided that the first actuating element also serves to adjust the second inhibiting device from the disabled state into the enabled state. The first actuating element is advantageously mounted in a housing, and the locking device is formed by the first actuating element and the housing. The housing is, in particular, a handle housing of the work apparatus, on which the operating element is mounted. The actuating element for adjusting the first and the second inhibiting device is advantageously pivoted about pivot axes which are arranged perpendicularly with respect to one another. As a result, actuating directions which are oriented perpendicularly with respect to one another can be achieved in a simple way for the first and the second inhibiting device. The actuating element or elements is/are advantageously mounted in a sprung manner. If an actuating element which is to be actuated in different directions is provided for both inhibiting devices, the actuating element is advantageously mounted such that it is sprung in both actuating directions. The actuating element is advantageously prestressed in the direction of the non-actuated position which is assigned, in particular, to the disabled state of the inhibiting device.

It can also be provided that the locking device locks the first inhibiting device electrically. In addition, the mechanical locking means of the actuating element of the first inhibiting device can be provided. As a result, it can be indicated to a user that the first inhibiting device is locked in its enabled state. However, it can also be provided that the locking takes place exclusively electrically, in particular by way of a corresponding program code in a microprocessor. Here, the actuating element can be adjusted back into its non-actuated position again. The position of the actuating element of the first inhibiting device can therefore be independent of whether the first inhibiting device is situated in the enabled state or in the disabled state.

In its disabled state, the second inhibiting device advantageously inhibits a movement of the operating element. However, it can also be provided that, in its disabled state, the second inhibiting device switches the operating element to the functionless state. In its disabled state, the first inhibiting device can inhibit the second inhibiting device or can inhibit a movement of the operating element or can switch the operating element to the functionless state.

At least one inhibiting device is advantageously mounted such that it is sprung in the direction of its disabled state. When an actuating element of the inhibiting device is let go, the inhibiting device is adjusted into its disabled state as a result. Both inhibiting devices are advantageously mounted such that they are sprung in the direction of their disabled state. If the first and/or the second inhibiting device act/acts electrically, the disabled state is the starting state of the inhibiting devices, and an adjustment into the enabled state has to be carried out actively by the user. The inhibiting device is situated in the enabled state only as long as the user actuates an actuating element of the second inhibiting device. As soon as the user lets go of the actuating element, the second inhibiting device is adjusted into the enabled state, that is to say the state which is stored electrically, for example, in a microprocessor is changed. The state of the inhibiting device can also be independent of the position of an actuating element for the inhibiting device in the case of the second inhibiting device. For example, it can be provided that the second inhibiting device is adjusted into the enabled state only when an actuating element for the first inhibiting device is actuated, while an actuating element for the second inhibiting device is actuated. If the actuating element for the first inhibiting device is not actuated, an actuation of the actuating element for the second inhibiting device can nevertheless be possible, but this actuation advantageously does not lead to the adjustment of the second inhibiting device into the released position.

For a method for operating the handheld work apparatus, it is provided that the first inhibiting device is locked in its enabled state when both inhibiting devices are situated in their enabled state at the same time. In particular, the first inhibiting device is locked in its enabled state when the second inhibiting device is adjusted into its enabled state while the first inhibiting device is situated in its disabled state. As a result, an actuating element for the first inhibiting device can be let go of after the second inhibiting device has been adjusted into its enabled state while the first inhibiting device was situated in its enabled state. As an alternative, it can also be provided that the first inhibiting device is locked in its enabled state when the first inhibiting device is adjusted into its enabled state while the second inhibiting device is situated in its enabled state. In order to adjust both inhibiting devices into their enabled state, in this case the second inhibiting device has to be adjusted into its enabled state and subsequently the first inhibiting device has to be adjusted into its enabled state. As soon as both inhibiting devices are situated in their enabled state, the locking of the first inhibiting device in its enabled state takes place, with the result that an actuating element for the first inhibiting device can be let go of again. In order to adjust both inhibiting devices into the enabled state, an actuating element for the first inhibiting device has to be tapped only briefly while the second inhibiting device is situated in the enabled state.

In order to start up the work apparatus, accordingly, both inhibiting devices merely have to have been actuated at the same time. However, this simultaneous actuation of both inhibiting devices does not have to be maintained for the entire operating time, since the first inhibiting device is locked in its enabled state. The locking action of the first inhibiting device in its enabled state is advantageously released when the second inhibiting device is restored into its disabled state. This results in simple and reliable operation. Since the first and the second inhibiting device do not have to be held by the operator in the actuated state permanently, the two inhibiting devices can be arranged in such a way that simultaneous actuation is not ergonomic and accidental simultaneous actuation of the two inhibiting devices can be ruled out.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
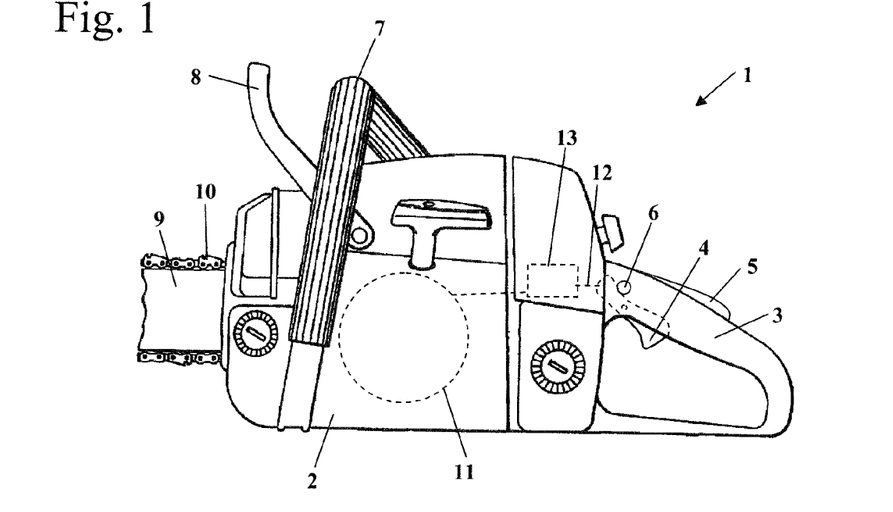
FIG. 1 shows a schematic of a motor-driven chain saw.

FIG. 1 shows a motor-driven chain saw 1 as an embodiment for a handheld work apparatus. The present invention can also be used in a different handheld work apparatus such as a hedge trimmer, a cutoff machine, a brushcutter, a blower device or the like. The motor-driven chain saw 1 has a housing 2, on which a handle 3 is fixed. An operating element 4 for operating a drive motor 11 which is arranged in the housing 2, a first actuating element 6 and a second actuating element 5 are mounted movably on the handle 3. The operating element 4 operates the drive motor 11 via a coupling element 12 and a control device 13. In the embodiment, the drive motor 11 is an electric motor which is advantageously supplied with energy by a battery, in particular a rechargeable battery. However, the drive motor 11 can also be supplied with energy via a connecting cable for connection to a power source. The drive motor 11 can also be an internal combustion engine. If the drive motor is an internal combustion engine, no control device 13 is required. The coupling element 12 advantageously acts on a control element of the internal combustion engine, for example on a throttle element which is arranged in an intake duct.

A bale handle 7 which reaches over the housing 2 is provided for guiding the motor-driven chain saw 1. A guide bar 9 protrudes toward the front on that side of the housing 2 which faces away from the handle 3. A saw chain 10 is driven in a circulating manner on the guide bar 9. A hand protection means 8 is arranged on that side of the bale handle 7 which faces the guide bar 9. The hand protection means 8 advantageously serves to trigger a brake device for bringing the saw chain 10 to standstill.

In order to start up the chain saw 1, first of all the first actuating element 6 has to be pressed and subsequently the second actuating element 5 has to be pivoted. While the second actuating element 5 is pivoted, the first actuating element 6 has to be held in a pressed state. After the second actuating element 5 has been actuated, the first actuating element 6 can be released. The operating element 4 is operatively connected to the drive motor 11 as long as the second actuating element 5 remains held in a pressed state. If the second actuating element 5 is released, the pivoting movement of the operating element 4 can be blocked, with the result that the operating element 4 cannot be actuated. As an alternative, the operative connection between the operating element 4 and the drive motor 11 can also be interrupted, with the result that pivoting of the operating element 4 does not act on the drive motor 11, but rather the operating element 4 is functionless.

As FIG. 1 shows, the actuating elements 5 and 6 are arranged spaced apart from one another. If the chain saw 1 is arranged in such a way that the second actuating element 5 is directed upwardly, the first actuating element 5 protrudes laterally out of the handle 3. Here, the first actuating element 6 is arranged in such a way that it cannot be actuated unintentionally by the operator when the operator carries the chain saw 1 using the handle 3. In order to make ergonomic operation possible, a locking device is provided which locks the first actuating element 6 in its enabled state, that is, in the state, in which the operating element 4 can actuate the drive motor 11, when the second actuating element 5 is likewise in its enabled state. As a result, the first actuating element 6 does not have to be held in a pressed state continuously, but rather has to be actuated merely in order to unlock the second actuating element 5. This results in ergonomic operation.

Figure 2:
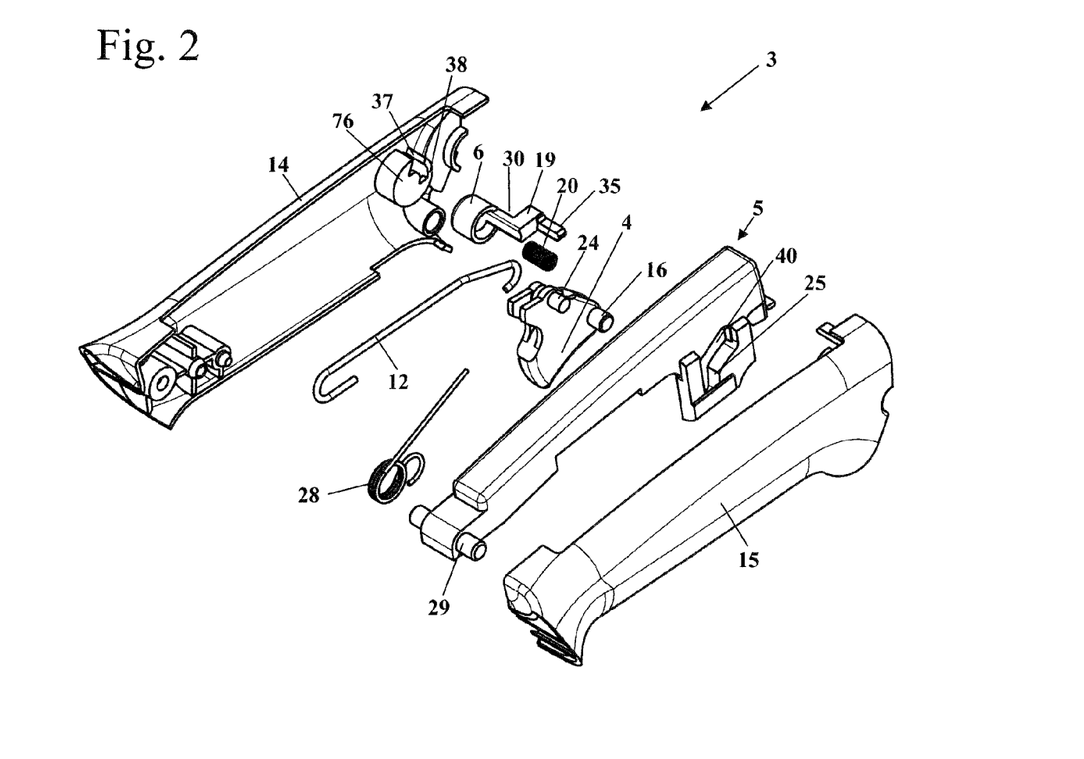
FIG. 2 shows an exploded perspective view of a first embodiment for a handle of the motor-driven chain saw from FIG. 1.

FIG. 2 shows the handle 3 in an exploded view. The operating element 4 is mounted on the handle 3 by way of a bearing pin 16. The handle 3 comprises a first grip half shell 14 and a second grip half shell 15. The operating element 4 has an inhibiting cam 24 which is arranged in a cutout 40 of the second actuating element 5. At the cutout 40, the second actuating element 5 has a stop 25, the function of which will be described in further detail in the following text. The second actuating element 5 is mounted pivotably on the handle 3 by way of a bearing pin 29 and is resiliently biased by a spring 28 in the direction of its non-actuated position.

Figure 5:
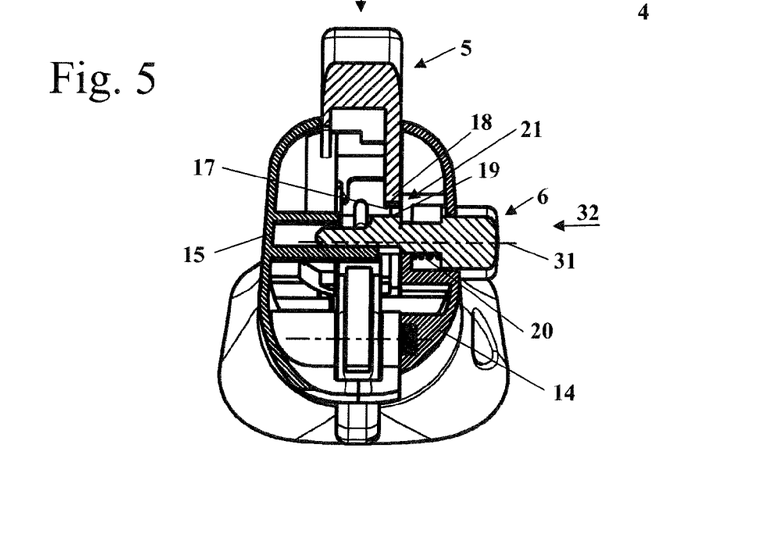
FIG. 5 shows a section along the line V-V in FIG. 3.

The first actuating element 6 is configured as a pushbutton. The first actuating element 6 is resiliently biased by a spring 20 in the direction of its non-actuated position. The first grip half shell 14 has a receptacle 76 for the first actuating element 6. The receptacle 76 has a slot 37 which makes it possible to mount the first actuating element 6, and a stop 38, against which the first actuating element 6 bears with an end face of an inhibiting section 19 in the non-actuated state. The inhibiting section 19 is formed on a bent-away portion of the first actuating element 6. Adjacently to the inhibiting section 19, the first actuating element has a cutout 30, into which the second actuating element 5 can engage. In the embodiment, the cutout 30 is the region which is arranged next to the inhibiting section 19 in the actuating direction 32 (FIG. 5). The first actuating element 6 has a guide lug 35 on the side which lies opposite the receptacle 76 and extends toward the second grip half shell 15. Moreover, FIG. 2 shows a coupling element 12, by way of which the operating element 4 acts on the control device 13. Here, further coupling elements are advantageously provided between the coupling element 12 and the control device 13. The coupling element 12 is configured as a pull rod.

Figure 3:
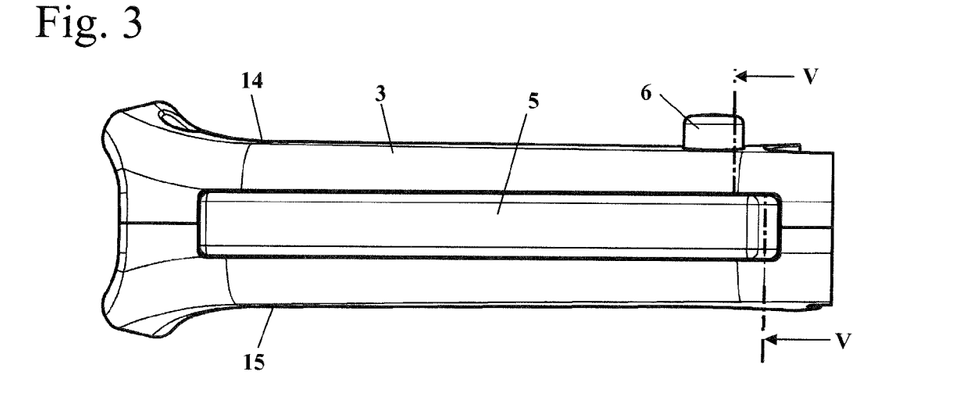
FIG. 3 shows the handle from FIG. 2 in plan view.
Figure 4:
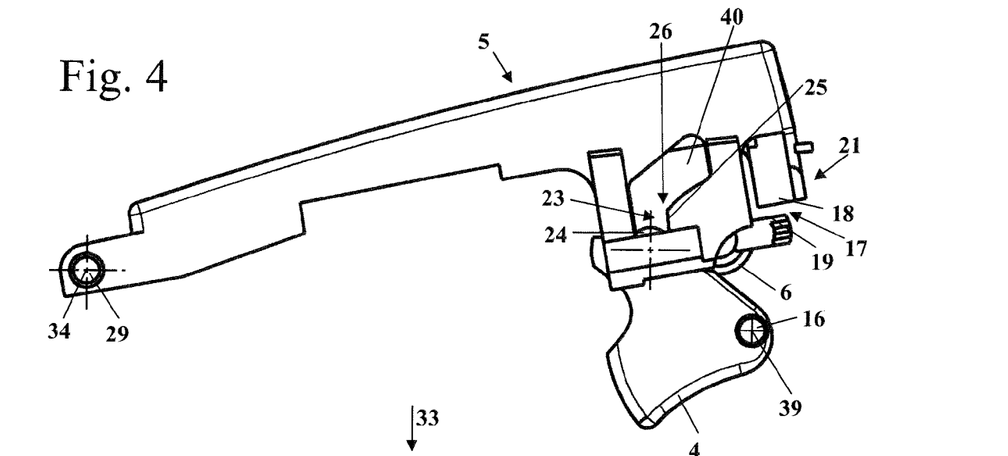
FIG. 4 shows a side view of the levers which are mounted on the handle.

FIGS. 3 to 5 show the handle 3, the first actuating element 6, the second actuating element 5 and the operating element 4 not being actuated. As FIG. 4 shows, the first inhibiting device 17 is formed between the first actuating element 6 and the second actuating element 5. The first inhibiting device 17 comprises an inhibiting section 18 on the second actuating element 5 and the inhibiting section 19 on the first actuating element 6. The inhibiting section 19 lies in the pivoting part of the inhibiting section 18 when the second actuating element 5 is pivoted about its pivot axis 34. As a result, the actuation of the second actuating element 5 is inhibited by the first actuating element 6. In the position which is shown in FIGS. 4 and 5, the first inhibiting device 17 is situated in its inhibited or disabled state 21.

A second inhibiting device 23 is formed between the inhibiting cam 24 of the operating element 4 and the stop 25 of the second actuating element 5. The inhibiting cam 24 protrudes into the cutout 40. The stop 25 is formed by a wall section of the cutout 40. In the non-actuated position (shown in FIG. 4) of the second actuating element 5, the stop 25 lies in the pivoting path of the inhibiting cam 24 about the pivot axis 39 which is formed by the bearing pin 16. The operating element 4 therefore cannot be pivoted. The second inhibiting device 23 is situated in its inhibited or disabled state 26.

As FIG. 5 shows, the first actuating element 6 is to be actuated in the direction of its longitudinal axis 31 in the actuating direction 32. Here, the first actuating element 6 is pressed into the handle 3, to be precise counter to the force of the spring 20. In the disabled state 21 (shown in FIG. 5) of the first inhibiting device 17, the inhibiting section 19 inhibits pivoting of the second actuating element 5. The second actuating element 5 is to be actuated here for pivoting about the pivot axis 34 in an actuating direction 33 which is arranged transversely, in the embodiment perpendicularly, with respect to the actuating direction 32 of the first actuating element 6.

Figure 6:
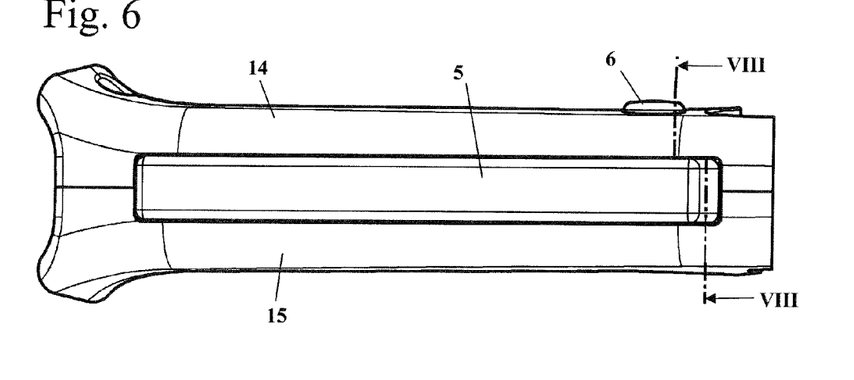
FIG. 6 shows the handle in a view corresponding to FIG. 3 with an actuated first actuating element.
Figure 7:
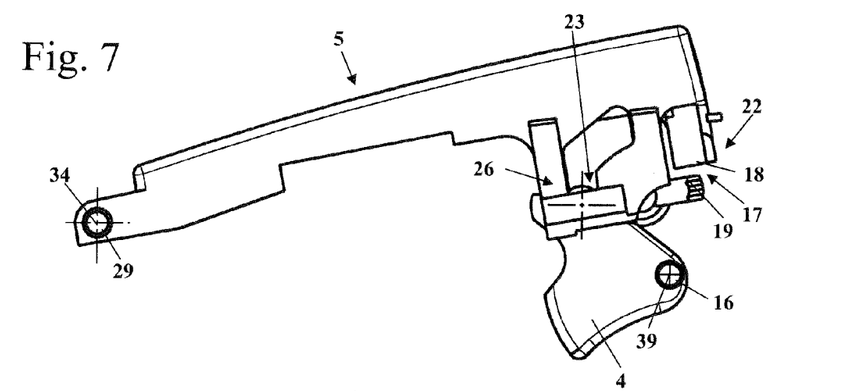
FIG. 7 shows the levers which are mounted on the handle, in a side view in the position from FIG. 6.
Figure 8:
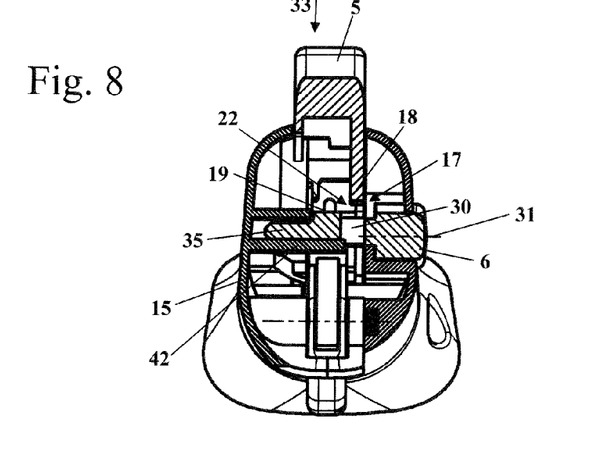
FIG. 8 shows a section along the line VIII-VIII in FIG. 6.
Figure 9:
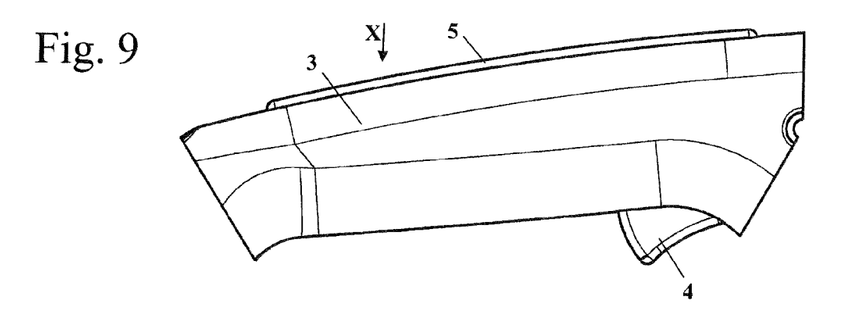
FIG. 9 shows the handle in a schematic corresponding to FIG. 3 with an actuated second actuating element.
Figure 10:
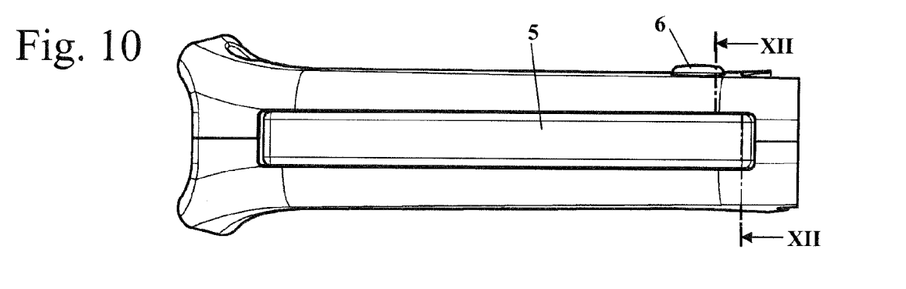
FIG. 10 shows a side view of the handle from FIG. 9 in the direction of the arrow X in FIG. 9.

FIGS. 6 to 8 show the arrangement with an actuated first actuating element 6. In this position of the first actuating element 6, the first inhibiting device 17 is situated in its released or enabled state 22. As FIG. 8 specifically shows, the inhibiting section 18 is arranged adjacently with respect to the cutout 30 of the first actuating element 6, with the result that the second actuating element 5 can be actuated in the actuating direction 33, as long as the first inhibiting device 17 is situated in its released or enabled state 22. As FIG. 8 also shows, the guide lug 35 is guided on the second grip half shell 15. Here, the guide lug 35 engages into a guide contour 42 (shown in FIG. 12) of the second grip half shell 15.

Figures 11, 12:
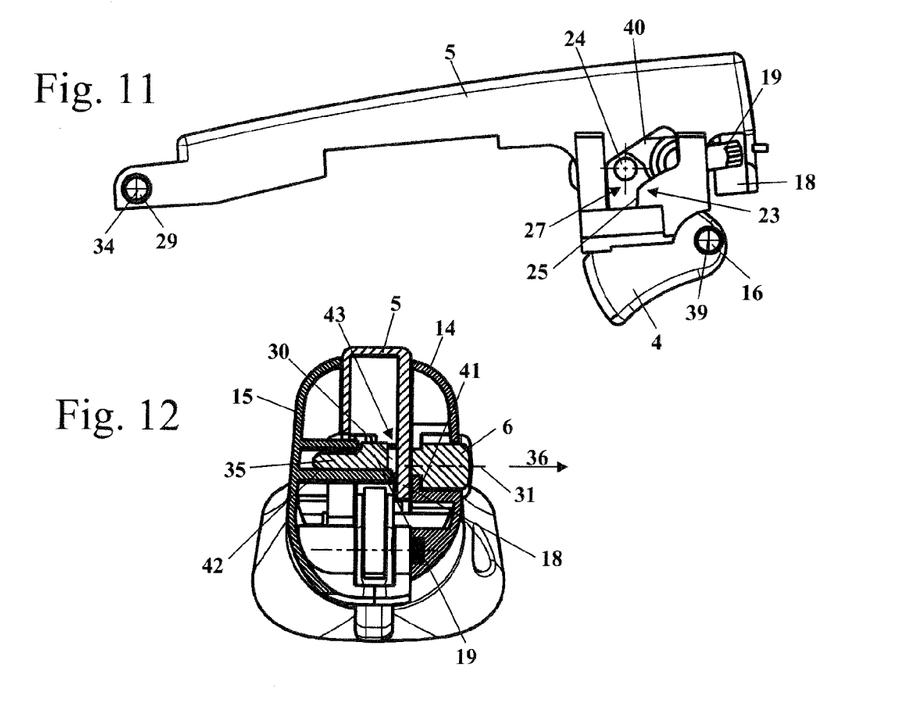
FIG. 11 shows the levers which are mounted on the handle, in the position shown in FIGS. 9 and 10.
FIG. 12 shows a section along the line XII-XII in FIG. 10.
Figure 13:
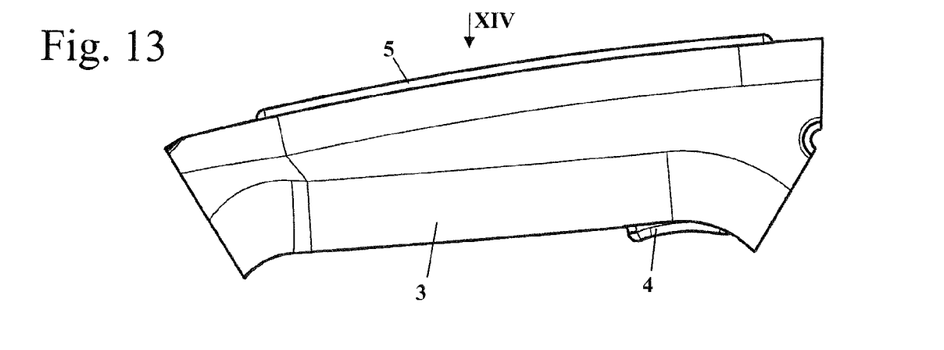
FIG. 13 shows the handle corresponding to the illustration from FIG. 9 with an actuated operating element.
Figure 14:
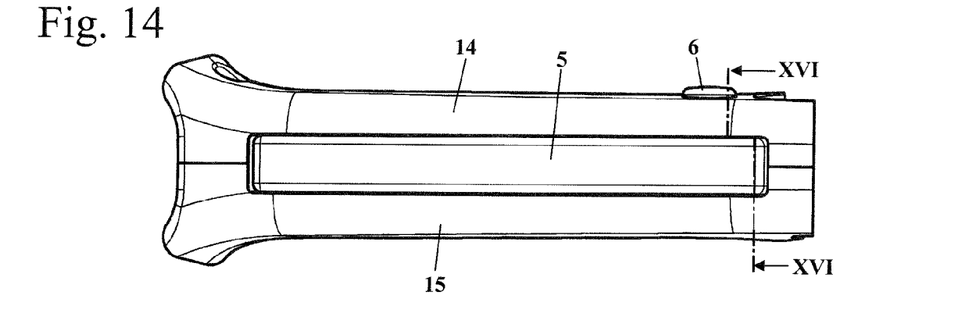
FIG. 14 shows a side view in the direction of the arrow XIV in FIG. 13.

FIGS. 9 to 12 also show the second actuating element 5 in the actuated state. To this end, the second actuating element 5 has been actuated in the actuating direction 33 which is shown in FIG. 8, and is therefore pressed downward in the position (shown in FIG. 1) of the chain saw 1. In this position, the inhibiting cam 24 no longer bears against the stop 25, as FIG. 11 shows. The second inhibiting device 23 is situated in its released or enabled state 27. In order to unlock the chain saw 1, accordingly, the first actuating element 6, that is, the operating button, has to be pressed laterally into the handle 3 and subsequently the second actuating element 5, that is, the throttle lever inhibitor, has to be pressed downward.

As FIG. 12 shows, the first inhibiting section 18 engages through the cutout 30. The inhibiting section 18 and the cutout 30 form a locking device 43 which prevents it being possible for the first actuating element 6 to be reset in the direction of the arrow 36 into its non-actuated position. In FIG. 12, the first actuating element 6 is actuated completely and bears against a stop 41 which is formed on the first grip half shell 14. If the actuating element 6 is released, it can move slightly in the direction of the arrow 36 in the direction of its longitudinal axis 31, until the inhibiting section 19 comes into contact with the inhibiting section 18. In this position, the first actuating element 6 remains locked until the second actuating element 5 is released and pivots back into its non-actuated position. The restoring of the second actuating element 5 takes place because of the force of the spring 28 which is shown in FIG. 2.

Figure 15:
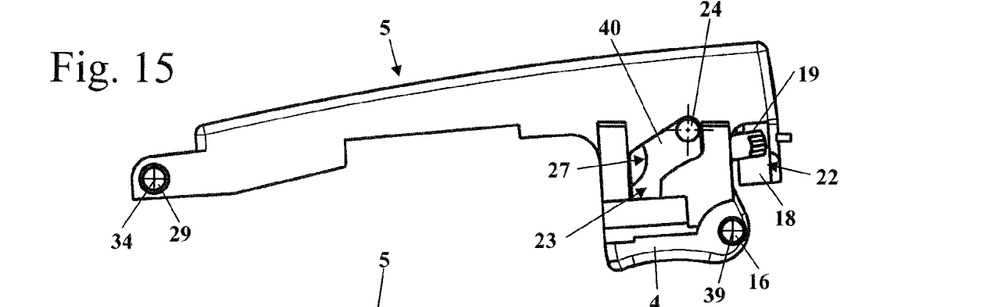
FIG. 15 shows the levers which are mounted on the handle, in the position shown in FIGS. 13 and 14.
Figure 16:
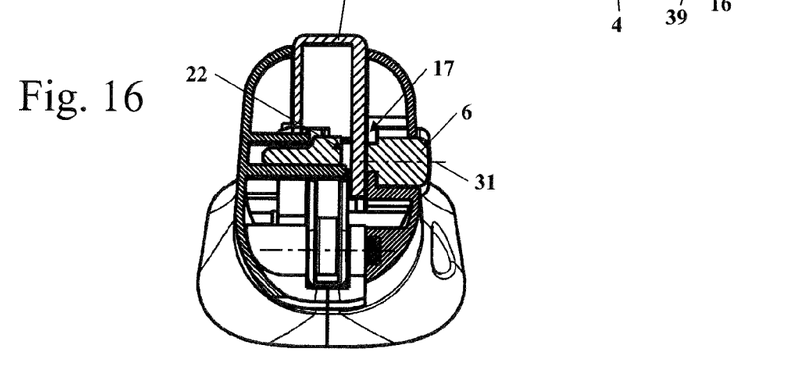
FIG. 16 shows a section along the line XVI-XVI in FIG. 14.

FIGS. 13 to 16 show the arrangement with an actuated operating element 4. As FIG. 15 shows, the operating element 4 has been pivoted about the pivot axis 39. Here, the inhibiting cam 24 has moved into the cutout 40. The first inhibiting device 17 and the second inhibiting device 23 are situated in their released or enabled state 22 and 27, respectively.

In the embodiment which is shown in FIGS. 2 to 16, the released or enabled state (22, 27) and the inhibited or disabled state (21, 26) corresponds in each case to a position of the associated actuating element (5, 6). Accordingly, the position of the actuating elements 5 and 6 is coupled to the state of the inhibiting devices (17, 23). However, the position of the actuating elements 5 and 6 can also be independent of the state of the associated inhibiting device 17 and 23. For example, the first actuating element 6 can be configured in two pieces, one part having the section which is to be actuated by the operator and a second part having the inhibiting section 19. Both parts are advantageously mounted in a sprung manner. If the first inhibiting device 17 is locked in its enabled state 22, the operator can let go of the operating button which is restored into its non-actuated position on account of the spring force. The inhibiting section 19 remains held by the inhibiting section 18, and the inhibiting device 17 remains in its enabled state 22, until the locking action is canceled by the second actuating element 5 being released.

Figure 17:
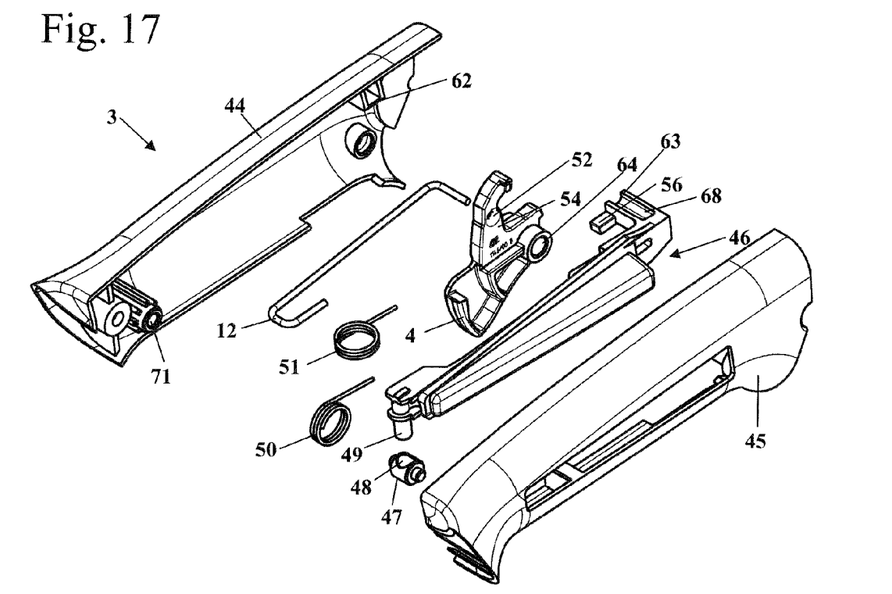
FIG. 17 shows an exploded perspective view of another embodiment of the handle.
Figure 20:
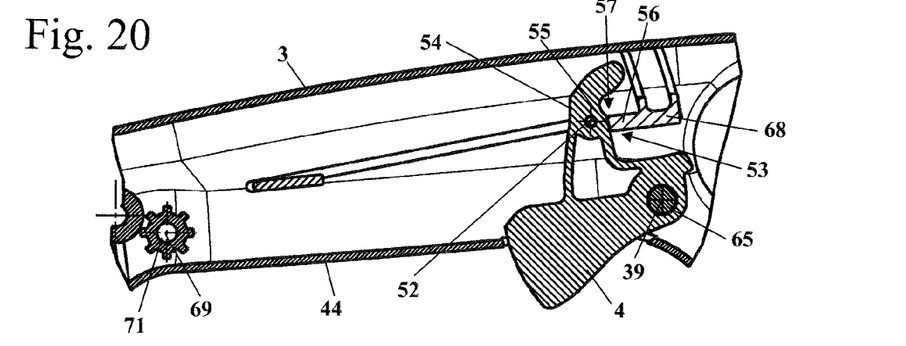
FIG. 20 shows a section along the line XX-XX in FIG. 19.

FIG. 17 shows a further embodiment for the handle 3 and the elements which are arranged thereon. Identical numerals denote elements which correspond to one another in all embodiments. As FIG. 17 shows, the handle 3 which is shown here is constructed from a first grip half shell 44 and a second grip half shell 45. An inhibiting contour 62 which will be described in further detail in the following text is formed integrally on the first grip half shell 44. The operating element 4 has a bearing seat 64 for a bearing pin 65 which is shown in FIG. 20. An opening 52 for hooking in the coupling element 12 is provided on the operating lever 4. The opening 52 is situated on an arm 54 of the operating element 4.

Figure 19:
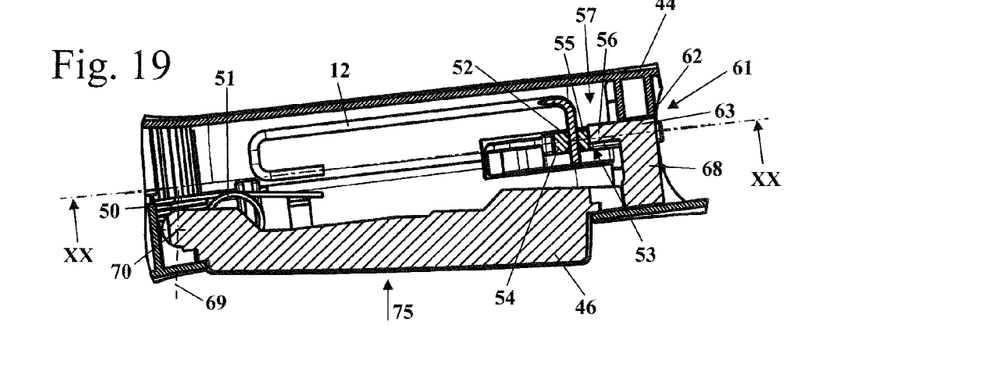
FIG. 19 shows a section along the line XIX-XIX in FIG. 18.

Moreover, an actuating element 46 is mounted on the handle 3, which actuating element 46 can be pivoted by way of a first bearing pin 47 about a first pivot axis 69 which is shown in FIG. 20 and by way of a second bearing pin 49 about a second pivot axis 70 which is shown in FIG. 19. The second bearing pin 49 protrudes into a bearing hole 48 which runs transversely through the first bearing pin 47. The actuating element 46 is mounted such that it is sprung about both pivot axes (69, 70) in the direction of the non-actuated position. To this end, a first spring 50 and a second spring 51 are provided.

As FIG. 17 shows, on the side which faces away from the bearing pin 49, the actuating element 46 has a transverse web 68, the end side of which forms a blocking section 63. The blocking section 63 interacts with the inhibiting contour 62 on the first grip half shell 44. An inhibiting section 56 is arranged on the transverse web 68, which inhibiting section 56 interacts with the arm 54 of the operating element 4, as will be described in further detail in the following text.

Figure 18:
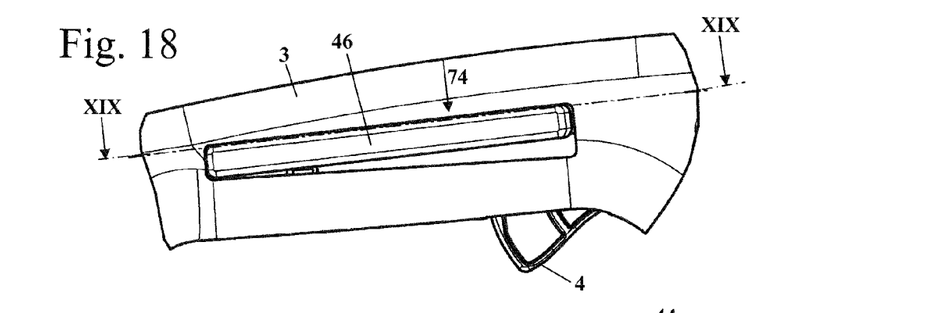
FIG. 18 shows a side view of the handle.

FIGS. 18 to 20 show the arrangement in a non-actuated position. From this position, the actuating element 46 is to be actuated in a first actuating direction 74. As FIG. 19 shows, the inhibiting section 56 of the actuating element 46 bears against a first region 55 of the arm 54 and inhibits pivoting of the operating element 4 as a result. As a result, the operating element 4 cannot act on the drive motor 11. Together with the first region 55 of the arm 54, the inhibiting section 56 forms a first inhibiting device 53 which is situated in an inhibited or disabled state 57 in the non-actuated position (shown in FIG. 19) of the actuating element 46. The blocking section 63 of the actuating element 46 bears immediately adjacently with respect to the inhibiting contour 62 against the housing of the handle 3, namely against the first grip half shell 44. As a result, the actuating element 46 cannot be pivoted in a second actuating direction 75 about the pivot axis 70 which is shown in FIG. 19. The blocking section 63 and the inhibiting contour 62 form a blocking device 61. FIG. 20 also shows the arrangement of the inhibiting section 56 on the first region 55 of the arm 54 which prevents pivoting of the operating element 4 about the pivot axis 39. As FIG. 20 also shows, the first grip half shell 44 has a receptacle 71 for the first bearing pin 47. A corresponding receptacle (not shown) is formed on the second grip half shell 45.

Figure 21:
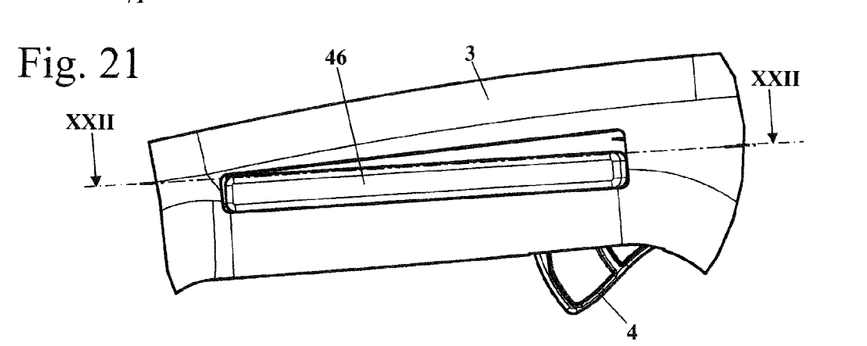
FIG. 21 shows a side view of the handle with a partially actuated actuating element.
Figure 22:
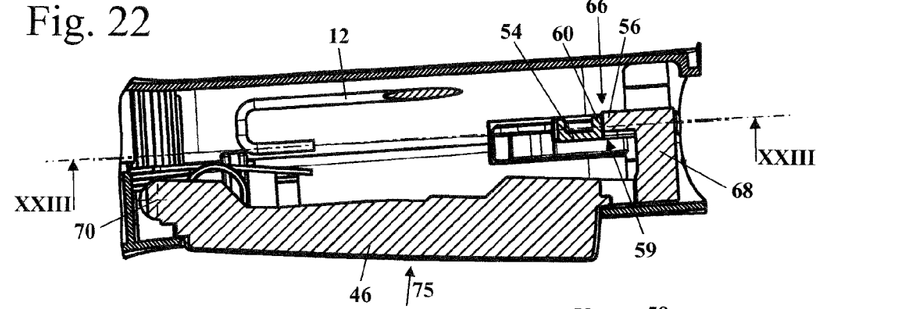
FIG. 22 shows a section along the line XXII-XXII in FIG. 21.
Figure 23:
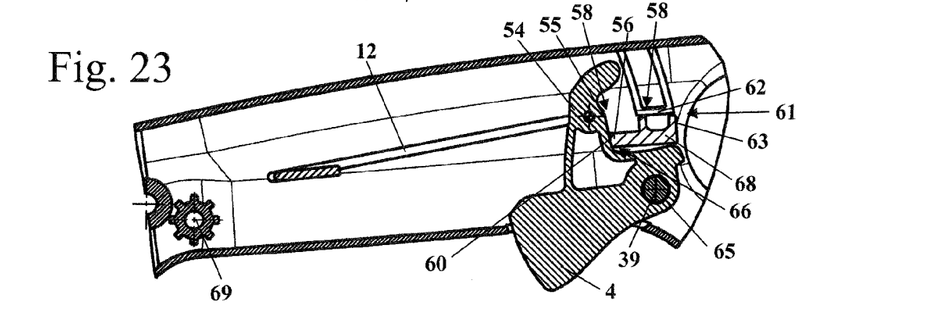
FIG. 23 shows a section along the line XXIII-XXIII in FIG. 22.

FIGS. 21 to 23 show the actuating element 46 after it has been pivoted about the first pivot axis 69 in the first actuating direction 74 (see FIGS. 18 and 19). In this position, the inhibiting section 56 bears against a second region 60 of the arm 54. Together with the second region 60, the inhibiting section 56 forms a second inhibiting device 59 which is situated in an inhibited or disabled state 66 in the position which is shown in FIG. 22. As FIG. 23 shows, the inhibiting section 56 is pivoted away from the first region 55, with the result that the first inhibiting device 53 is situated in its released or enabled state 58. However, pivoting of the operating element 4 is not possible on account of the disabled state 66 of the second inhibiting device 59. As FIG. 23 also shows, the blocking device 61 no longer blocks the pivoting of the actuating element 46 about the second pivot axis 70 (FIG. 22). The blocking section 63 no longer bears against the inhibiting contour 62.

Figure 24:
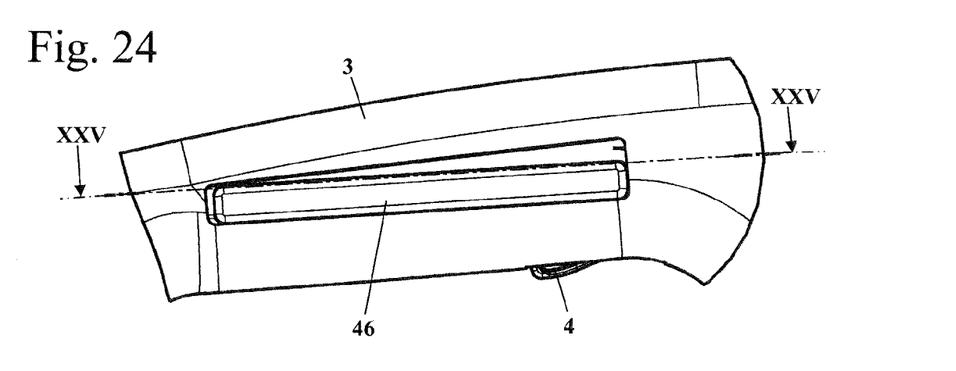
FIG. 24 shows a side view of the handle with an actuated actuating element and an actuated operating element.
Figure 25:
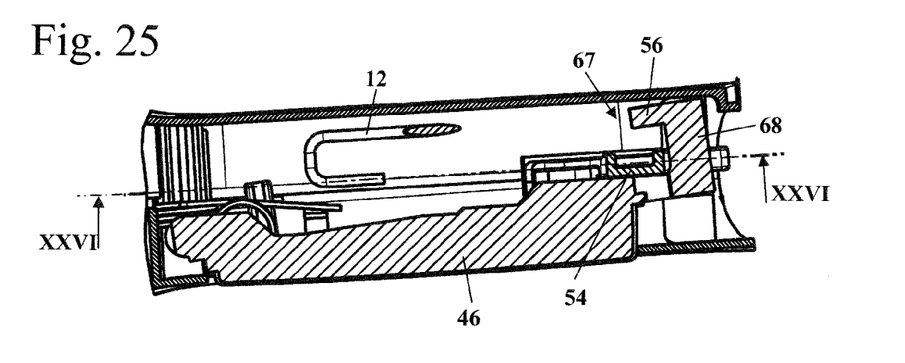
FIG. 25 shows a section along the line XXV-XXV in FIG. 24.
Figure 26:
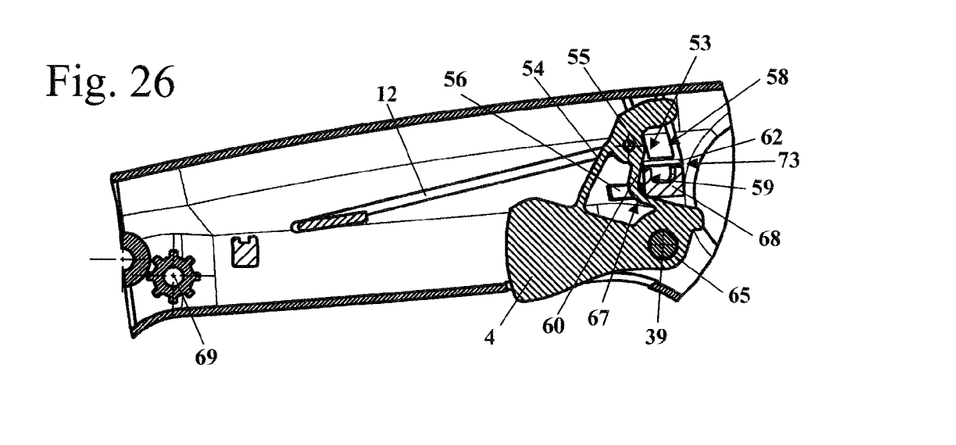
FIG. 26 shows a section along the line XXVI-XXVI in FIG. 25.

FIGS. 24 to 26 show the arrangement after the actuating element 46 has been pivoted about the pivot axis 70 out of the position which is shown in FIGS. 21 to 23 and the operating element 4 has been actuated. As FIGS. 25 and 26 show, the first inhibiting device 53 is situated in its released or enabled state 58, and the second inhibiting device 59 is situated in its released or enabled state 67. The inhibiting section 56 bears neither against the first region 55 nor against the second region 60. Together with the transverse web 68, the inhibiting contour 62 forms a locking device 73 which prevents it being possible for the actuating element 46 to pivot back about the pivot axis 69. In order to operate the operating element 4, the actuating element 46 has to be pivoted in the two actuating directions 74 and 75. Here, first of all pivoting has to take place in the actuating direction 74 about the pivot axis 69, and subsequently pivoting has to take place in the actuating direction 75 about the pivot axis 70. Here, the actuating directions 74 and 75 lie transversely, in particular perpendicularly, with respect to one another. If the actuating element 46 is pivoted in the second actuating direction 75, the locking device 73 locks the actuating element 46 against pivoting counter to the first actuating direction 74. The actuating element 46 then only has to be held in the second actuating direction 75, but no longer in the first actuating direction 74. This results in simple operation.

Figure 27:
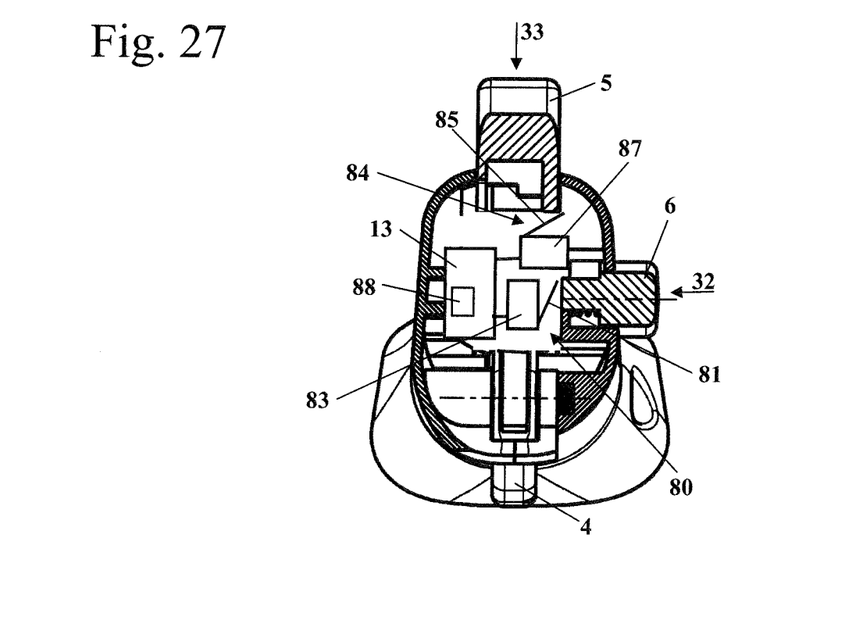
FIG. 27 shows a section through an exemplary embodiment of the handle corresponding to the schematic in FIG. 5.
Figure 28:
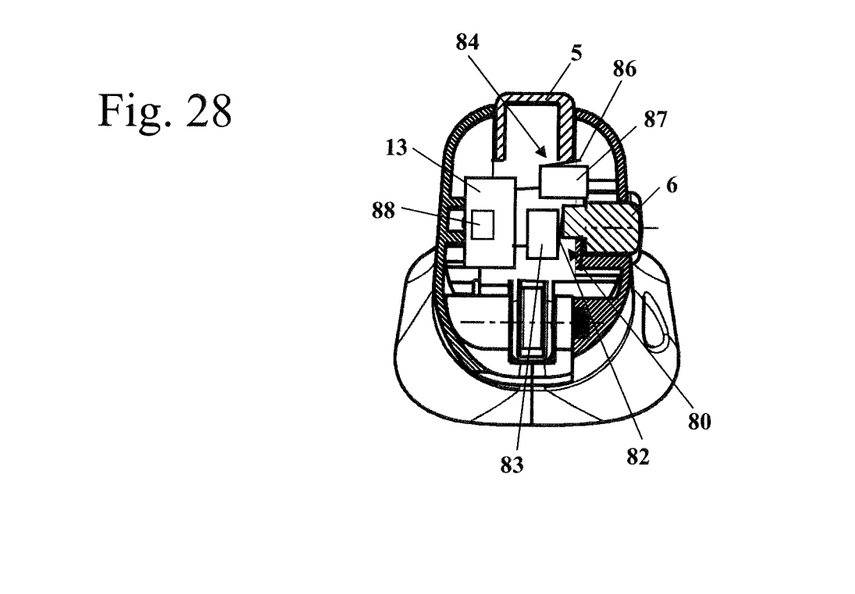
FIG. 28 shows a section through the exemplary embodiment which is shown in FIG. 27, corresponding to the illustration in FIG. 12.

The preceding figures show mechanical locking means of the first inhibiting device by way of the second inhibiting device. FIGS. 27 and 28 shows an exemplary embodiment, in which the locking action takes place electrically. Identical designations also denote identical elements here, as in the preceding figures. Two actuating elements 5 and 6 are provided which correspond approximately to the actuating elements 5 and 6 which are described with respect to FIGS. 2 to 16. The first actuating element 6 acts on a first switch 83, and the second actuating element 5 acts on a second switch 87. Both switches (83, 87) are connected to the control device 13 which comprises a locking device 88. The locking device 88 can be, for example, a corresponding program code in a microprocessor of the control device 13. In the state which is shown in FIG. 27, both switches 83 and 87 are not actuated. The first switch 83 forms part of the first inhibiting device 80 which is situated in an inhibited or disabled state 81 in the position which is shown. The second switch 87 forms part of a second inhibiting device 84 which is likewise situated in an inhibited or disabled state 85. If the first actuating device 6 and the second actuating device 5 are actuated in the direction of the actuating directions 32 and 33, the arrangement is transferred into the position which is shown in FIG. 28. Both inhibiting devices 80 and 84 are then situated in their released or enabled state 82 and 86, respectively. Both switches 83 and 87 are actuated. In this position, the locking device 88 locks the first actuating element 6 in its released or enabled state 82. The released or enabled state 82 of the first inhibiting device 80 is not canceled and the inhibiting device 80 adjusted into its inhibited or disabled state 81 until the second actuating element 5 is let go of and the second inhibiting device 84 is adjusted into its disabled state 85. This is advantageously achieved by way of corresponding programming of the locking device 88.

In the actuated position which is shown in FIG. 28, the actuating element 6 can be latched mechanically. However, the actuating element 6 is advantageously configured as a button and is adjusted back into its non-actuated position after it has been let go of by the operator. Here, the enabled state 82 of the first inhibiting device 80 is maintained independently of the position of the first operating element 6. Merely the second actuating element 5 has to remain actuated, in order to maintain the locking action of the first inhibiting device 80 in the enabled state 82.

It can be provided by way of corresponding programming of the control device 13 that the first actuating element 6 and the second actuating element 5 have to be actuated in a stipulated actuating sequence, in order to release the operating element 4 for operating the drive motor 11 (FIG. 1). Advantageously, first of all the first actuating element 6 has to be actuated and subsequently the second actuating element 5 has to be actuated. However, another actuating sequence can also be provided. It can also be provided that both actuating elements (5, 6) do not have to be actuated at the same time, but rather an actuation at a stipulated, brief time interval is sufficient to release the operating element 4. The control device 13 advantageously switches the operating element 4 for operating the drive motor 11 to the functionless state as long as both inhibiting devices 80 and 84 are not situated in their enabled state (82, 86).

The state of the inhibiting devices can be independent of the position of the associated actuating element.

Figure 29:
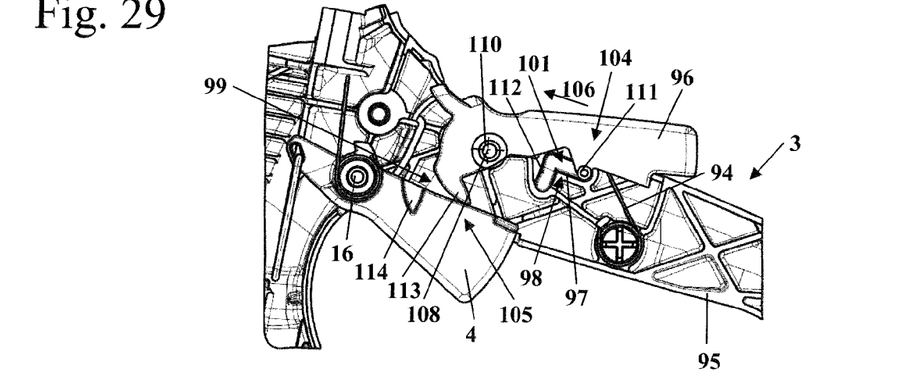
FIG. 29 shows a section through an embodiment of the handle.
Figure 30:
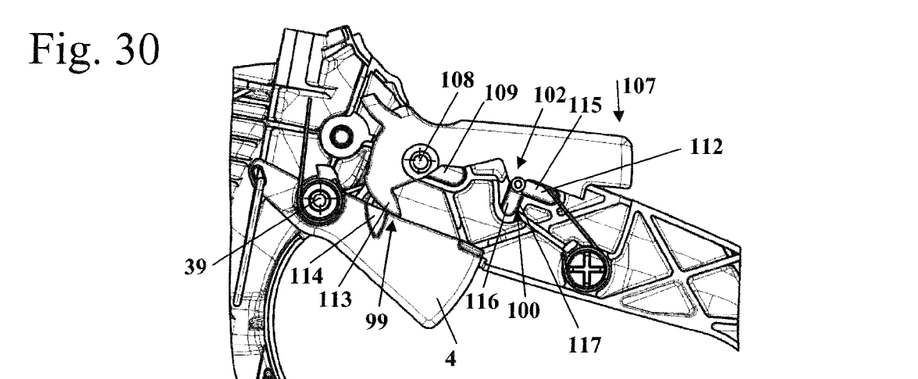
FIG. 30 shows the section from FIG. 29 with a partially actuated actuating element; and, FIG. 31 shows the section from FIG. 29 with an actuated actuating element and an actuated operating element.
Figure 31:
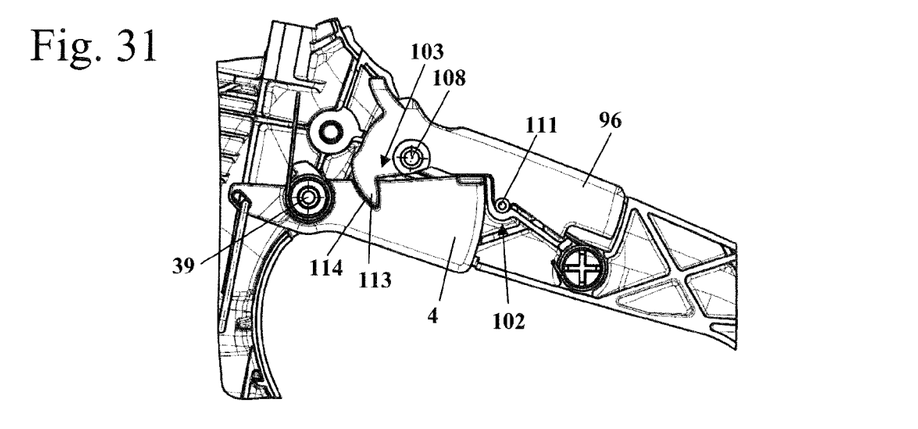

FIGS. 29 to 31 show a further embodiment of a handle 3 with an actuating element 96 mounted thereon and an operating element 4. Identical designations denote elements which correspond to one another in all the figures. In the exemplary embodiment which is shown in FIGS. 29 to 31, a first inhibiting device 98 and a second inhibiting device 99 are provided which inhibit an actuation of the operating element 4 as long as both inhibiting devices 98 and 99 are not situated in their enabled state 102 and 103.

The first inhibiting device 98 is formed between a half shell 95 of the handle 3 and the actuating element 96. Here, the handle 3 is advantageously formed by two half shells 95 of mirror-symmetrical configuration, of which only one is shown in the figures. The actuating element 96 is prestressed by a spring 94 in the direction of the non-actuated position which is shown in FIG. 29. The actuating element 96 has two guide journals 111, of which one is shown in FIG. 29. The guide journals 111 protrude into a groove 112 which is formed in the handle 3. A longitudinal side of the groove 112 forms an inhibiting contour 97 of the first inhibiting device 98. In the position (shown in FIG. 29) of the actuating element 96, the inhibiting contour 97 lies in the pivoting path of the actuating element 96 about its pivot axis 108 and prevents it being possible for the actuating element 96 to be pivoted about the pivot axis 108 out of the non-actuated position which is shown in FIG. 29. The first inhibiting device 98 is situated in its disabled state 104 in the position which is shown in FIG. 29. Together with the guide journal 111, the inhibiting contour 97 forms a blocking device 101 which prevents pivoting of the actuating element 96 about its pivot axis 108. The inhibiting contour 97 therefore fixes the sequence, in which the two movements of the actuating element 96 are to be carried out in order to release the two inhibiting devices 98 and 99.

A second inhibiting device 99 is formed between an inhibiting section 113 of the actuating element 96 and the operating element 4. In the disabled state 105 (shown in FIG. 29) of the second inhibiting device 99, the inhibiting section 113 bears against a longitudinal side of the operating element 4. The inhibiting section 113 lies in the pivoting path of the operating element 4. As a result, the operating element 4 cannot be actuated.

FIG. 30 shows the arrangement from FIG. 29 after the actuating element 96 has been displaced in the direction of the first actuating direction 106 which is shown in FIG. 29. When the actuating element 96 is displaced, the guide journal 111 slides in the groove 112. The groove 112 is of approximately L-shaped configuration, a first section 115 of the groove 112 running parallel to the first actuating direction 106 and a second section 116 running transversely with respect hereto. Here, the second section 116 is configured as a circular arc section about the pivot axis 108. When the actuating element 96 is displaced in the first actuating direction 106, the guide journal 111 slides in the first section 115 of the groove 112. As FIG. 30 also shows, the actuating element 96 has a bearing pin 110, on which the pivot axis 108 of the actuating element 96 is formed. The bearing pin 110 of the actuating element 96 is guided in a longitudinal groove 109 on the handle 3, which longitudinal groove 109 runs parallel to the first section 115 of the groove 112 and in the first actuating direction 106. The longitudinal groove 109 makes it possible to displace the actuating element 96 in the first actuating direction 106. Here, the position of the pivot axis 108 changes on the handle 3.

In the position which is shown in FIG. 30, the first inhibiting device 98 is situated in its enabled state 102. The second inhibiting device 99 is situated in its disabled state 105. The inhibiting section 113 bears against the operating element 4. The inhibiting section 113 lies in the pivoting path of the operating element 4 and, as a result, prevents it being possible for the operating element 4 to be pivoted. The actuating element 96 can be pivoted out of the position which is shown in FIG. 30 about its pivot axis 108 in a second actuating direction 107 which lies transversely, in particular approximately perpendicularly, with respect to the first actuating direction 106. Here, the guide journal 111 slides in the second section 116 of the groove 112. That wall 117 of the groove 112 which lies counter to the first actuating direction 106 prevents it being possible for the actuating element 96 to move counter to the first actuating direction 106 (FIG. 29). Together with the guide journal 111, the wall 117 forms a locking device 100 which holds the first inhibiting device 98 in its released or enabled state 102.

In FIG. 31, the second inhibiting device 99 is also arranged in its released or enabled state 103. The actuating element 96 has been pivoted out of the position which is shown in FIG. 30 about its pivot axis 108 in the second actuating direction 107 until the inhibiting section 113 has passed into the region of the cutout 114. As a result, it was possible for the operating element 4 to be pivoted about its pivot axis 39 into the completely actuated position which is shown in FIG. 31. The operator has to hold the actuating element 96 actuated merely in the second actuating direction 107 by virtue of the fact that the locking device 100 (FIG. 30) holds the first inhibiting device 98 in its released or enabled position 102.

It is understood that the foregoing description is that of the preferred embodiments of the invention and that various changes and modifications may be made thereto without departing from the spirit and scope of the invention as defined in the appended claims.

What is claimed is:

1. A handheld work apparatus comprising:
   a work tool;
   a drive motor for driving said work tool;
   an operating element configured to permit an operator to operate said drive motor via said operating element;
   a first inhibiting unit;
   a first actuating element configured to shift said first inhibiting unit from a disabling state of said first inhibiting unit into an enabling state thereof in response to an actuation of said first actuating element by the operator wherein said operating element is blocked when said first inhibiting unit is in said disabling state thereof and wherein said operating element is unblocked to permit operation of said drive motor via said operating element when said first inhibiting unit is in said enabling state thereof;
   a second inhibiting unit;
   a second actuating element configured to shift said second inhibiting unit from a disabling state of said second inhibiting unit into an enabling state thereof in response to an actuation of said second actuating element by the operator wherein said operating element is blocked when said second inhibiting unit is in said disabling state thereof and wherein said operating element is unblocked to permit operation of said drive motor when said second inhibiting unit is in said enabling state thereof; and, a locking device configured to lock said first inhibiting unit in said enabling state thereof when said second inhibiting unit is in said enabling state thereof so as to prevent said first inhibiting unit from blocking said operating element also when the operator releases said first actuating element as long as said second actuating element is actuated by the operator so as to cause said second inhibiting unit to be in said enabling state thereof.

2. The handheld work apparatus of claim 1, further comprising a blocking device configured to block a shift of said second inhibiting unit into said enabling state thereof when said first inhibiting unit is in said disabling state thereof.

3. The handheld work apparatus of claim 2, wherein said blocking device includes an inhibiting contour for blocking the shift of said second inhibiting unit into said enabling state thereof.

4. The handheld work apparatus of claim 1, wherein said first and second inhibiting units define respective actuation directions lying transversely to each other.

5. The handheld work apparatus of claim 1, wherein said locking device is configured to mechanically lock said first inhibiting unit.

6. The handheld work apparatus of claim 1, wherein said locking device is configured from said first actuating element and said second actuating element.

7. A handheld work apparatus comprising:
a work tool;
a drive motor for driving said work tool;
an operating element configured to permit an operator to operate said drive motor via said operating element;
a first inhibiting unit;
a first actuating element configured to shift said first inhibiting unit from a disabling state of said first inhibiting unit into an enabling state thereof in response to an actuation of said first actuating element by the operator wherein said operating element is blocked when said first inhibiting unit is in said disabling state thereof and wherein said operating element is unblocked to permit operation of said drive motor via said operating element when said first inhibiting unit is in said enabling state thereof;
a second inhibiting unit;
wherein said first actuating element is configured to shift said second inhibiting unit when said first actuating element is actuated by the operator from said disabling state thereof into said enabling state thereof;
wherein said first actuating element is shiftable in a first actuating direction to shift said first inhibiting unit into said enabling state thereof;
wherein said first actuating element is shiftable in a second actuating direction to shift said second inhibiting unit into said enabling state thereof;
wherein said first and second actuating directions are mutually different directions;
wherein said operating element is blocked in said disabling state of said second inhibiting unit;
wherein said second inhibiting unit effects no blocking of said operating element when said second inhibiting unit is in said enabling state thereof;
a locking device configured to lock said first inhibiting unit in said enabling state thereof when said second inhibiting unit is in said enabling state thereof so as to prevent said first inhibiting unit from blocking said operating element also when the operator does not hold said first actuating element in said first actuating direction as long as said first actuating element is held in said second actuating direction by the operator so that said second inhibiting unit is in said enabling state thereof.

8. The handheld work apparatus of claim 7, further comprising:
a housing;
said first actuating element being supported in said housing; and,
said locking device being comprised of said first actuating element and said housing.

9. The handheld work apparatus of claim 1, wherein said locking device is configured to lock said first inhibiting unit electrically.

10. The handheld work apparatus of claim 1, wherein said second inhibiting unit in said disabling state thereof is configured to block a movement of said operating element.

11. The handheld work apparatus of claim 1, wherein said second inhibiting unit in said disabling state thereof switches said operating element to be inoperative.

12. The handheld work apparatus of claim 1, wherein at least one of said inhibiting units is spring biased in a direction toward the disabling state thereof.

13. A method of operating a handheld work apparatus including: a work tool; a drive motor for driving said work tool; an operating element configured to permit an operator to operate said drive motor via said operating element; a first inhibiting unit; a first actuating element configured to shift said first inhibiting unit from a disabling state of said first inhibiting unit into an enabling state thereof in response to an actuation of said first actuating element by the operator wherein said operating element is blocked when said first inhibiting unit is in said disabling state thereof and wherein said operating element is unblocked to permit operation of said drive motor via said operating element when said first inhibiting unit is in said enabling state thereof; a second inhibiting unit; a second actuating element configured to shift said second inhibiting unit from a disabling state of said second inhibiting unit into an enabling state thereof in response to an actuation of said second actuating element by the operator wherein said operating element is blocked when said second inhibiting unit is in said disabling state thereof and wherein said operating element is unblocked to permit operation of said drive motor when said second inhibiting unit is in said enabling state thereof; the method comprising the step of:
locking said first inhibiting unit in said enabling state thereof when said first inhibiting unit and said second inhibiting unit are simultaneously in their respective enabling states so as to prevent said first inhibiting unit from blocking said operating element also when the operator releases said first actuating element as long as said second actuating element is actuated by the operator so as to cause said second inhibiting unit to be in said enabling state thereof.

14. A method of operating a handheld work apparatus including: a work tool; a drive motor for driving said work tool; an operating element configured to permit an operator to operate said drive motor via said operating element; a first inhibiting unit; a first actuating element configured to shift said first inhibiting unit from a disabling state of said first inhibiting unit into an enabling state thereof in response to an actuation of said first actuating element by the operator wherein said operating element is blocked when said first inhibiting unit is in said disabling state thereof and wherein said operating element is unblocked to permit operation of said drive motor via said operating element when said first inhibiting unit is in said enabling state thereof; a second inhibiting unit; wherein said first actuating element is configured to shift said second inhibiting unit when said first actuating element is actuated by the operator from said disabling state thereof into said enabling state thereof; wherein said first actuating element is shiftable in a first actuating direction to shift said first inhibiting unit into said enabling state thereof; wherein said first actuating element is shiftable in a second actuating direction to shift said second inhibiting unit into said enabling state thereof; wherein said first and second actuating directions are mutually different directions; wherein said operating element is blocked in said disabling state of said second inhibiting unit; wherein said second inhibiting unit effects no blocking of said operating element when said second inhibiting unit is in said enabling state thereof; the method comprising the step of:

locking said first inhibiting unit in said enabling state thereof when said first inhibiting unit and said second inhibiting unit are simultaneously in their respective enabling states so as to prevent said first inhibiting unit from blocking said operating element also when the operator does not hold said first actuating element in said first actuating direction as long as said first actuating element is held in said second actuating direction by the operator so that said second inhibiting unit is in said enabling state thereof.

* * * * *